US011422010B2

(12) United States Patent
Kubozono (10) Patent No.: US 11,422,010 B2
(45) Date of Patent: Aug. 23, 2022

(54) ELECTROMAGNETIC INDUCTION TYPE ENCODER AND USING METHOD OF THE SAME

(71) Applicant: MITUTOYO CORPORATION, Kanagawa (JP)

(72) Inventor: Hiroto Kubozono, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 17/101,270

(22) Filed: Nov. 23, 2020

(65) Prior Publication Data
US 2021/0190544 A1 Jun. 24, 2021

(30) Foreign Application Priority Data
Dec. 23, 2019 (JP) .................................. 2019-231719

(51) Int. Cl.
*G01D 5/20* (2006.01)
*G01D 5/249* (2006.01)

(52) U.S. Cl.
CPC ......... *G01D 5/2073* (2013.01); *G01D 5/2497* (2013.01)

(58) Field of Classification Search
CPC ........................... G01D 5/2073; G01D 5/2497
See application file for complete search history.

(56) References Cited

U.S. PATENT DOCUMENTS 5,886,519 A * 3/1999 Masreliez ............... G01B 7/003
336/131
6,271,661 B2 * 8/2001 Andermo ............. G01D 5/2495
341/1
6,297,750 B1 * 10/2001 Wingate ................. G01D 5/206
341/11
6,329,813 B1 * 12/2001 Andermo ............... G01B 3/205
324/207.12
6,636,035 B2 * 10/2003 Kiriyama ................. G01D 3/08
324/207.17
6,646,434 B2 * 11/2003 Miyata ................... G01D 5/208
324/207.17

(Continued)

FOREIGN PATENT DOCUMENTS

| JP | 2000-180209 | 6/2000 |
| JP | 2009-186200 | 8/2009 |

*Primary Examiner* — Walter L Lindsay, Jr.
*Assistant Examiner* — Milton Gonzalez
(74) *Attorney, Agent, or Firm* — Rankin, Hill & Clark LLP (57) ABSTRACT

An electromagnetic induction type encoder includes a detection head and a scale. The detection head has a first transceiver coil to generate magnetic flux with respect to a first track and a second transceiver coil to generate magnetic flux with respect to a second track. The scale has a first plurality of periodical elements with respect to the first track and a second plurality of periodical elements with respect to the second track. The detection head has a receiver coil that continuously extends from the first track to the second track, is electromagnetically coupled with the magnetic flux generated by the first plurality of periodical elements and the magnetic flux generated by the second plurality of periodical elements, and detects a phase of the magnetic flux generated by the first plurality of periodical elements and a phase of the magnetic flux generated by the second plurality of periodical elements.

8 Claims, 8 Drawing Sheets

(56) References Cited

U.S. PATENT DOCUMENTS

| | | | |
|---|---|---|---|
| 9,013,192 B2 * | 4/2015 | Vasiloiu | G01B 7/003 324/207.17 |
| 2009/0195241 A1 | 8/2009 | Naayama et al. | |
| 2017/0160102 A1 * | 6/2017 | Heumann | G01D 5/2013 |
| 2017/0241809 A1 * | 8/2017 | Hubrich | G01D 5/2073 |

* cited by examiner

ELECTROMAGNETIC INDUCTION TYPE ENCODER AND USING METHOD OF THE SAME

CROSS-REFERENCE TO RELATED APPLICATION

This application is based upon and claims the benefit of priority of the prior Japanese Patent Application No. 2019-231719, filed on Dec. 23, 2019, the entire contents of which are incorporated herein by reference.

FIELD

A certain aspect of embodiments described herein relates to an electromagnetic induction type encoder and a using method of the electromagnetic induction type encoder.

BACKGROUND

There is known electromagnetic induction type encoders using electromagnetic connection between a detection head and a scale (for example, see Japanese Patent Application Publication No. 2000-180209).

SUMMARY

In the electromagnetic induction type encoders, a track for ABS (absolute) is provided in the most accurate track. An absolute position is calculated by a signal processing with use of a signal extracted by the track for ABS. Each track of a sensor substrate has two or more signal lines for driving and four or more signal lines for a receiver coil. When the number of the track is increased in order to lengthen an ABS length, the number of extraction wirings increases in proportion to the number of the track. However, an area of a sensor substrate is limited. When the number of the extraction wirings of a receiver coil increases, it is difficult to downsize the sensor substrate. In addition, the number of input ports to a signal processing IC increases. It is therefore difficult to downsize the IC. It is important to reduce the number of the extraction wirings of the receiver coil, in order to provide an encoder which has a small size and has a long ABS length.

In one aspect of the present invention, it is an object to provide an electromagnetic induction type encoder that is capable of reducing the number of extraction wirings of a receiver coil and a using method of the electromagnetic induction type encoder.

According to an aspect of the present invention, there is provided an electromagnetic induction type encoder including: a detection head and a scale that face with each other and relatively moves in a measurement axis with respect to each other, wherein the detection head has a first transceiver coil configured to generate magnetic flux with respect to a first track and a second transceiver coil configured to generate magnetic flux with respect to a second track, wherein the scale has a first plurality of periodical elements that are conductors periodically arrayed in the measurement axis with respect to the first track and a second plurality of periodical elements that are conductors periodically arrayed in the measurement axis with respect to the second track, wherein the detection head has a receiver coil that continuously extends from the first track to the second track, is electromagnetically coupled with the magnetic flux generated by the first plurality of periodical elements and the magnetic flux generated by the second plurality of periodical elements, and detects a phase of the magnetic flux generated by the first plurality of periodical elements and a phase of the magnetic flux generated by the second plurality of periodical elements.

According to an aspect of the present invention, there is provided a using method of an electromagnetic induction type encoder including: transmitting a first transmission signal to a first transceiver coil of a first track while not transmitting a second transmission signal to a second transceiver coil of a second track; and transmitting the second transmission signal to the second transceiver coil while not transmitting the first trans mission signal to the first transceiver coil, wherein the electromagnetic induction type encoder comprises a detection head and a scale that face with each other and relatively moves in a measurement axis with respect to each other, wherein the detection head has the first transceiver coil configured to generate magnetic flux with respect to the first track and the second transceiver coil configured to generate magnetic flux with respect to the second track, wherein the scale has a first plurality of periodical elements that are conductors periodically arrayed in the measurement axis with respect to the first track and a second plurality of periodical elements that are conductors periodically arrayed in the measurement axis with respect to the second track, wherein the detection head has a receiver coil that continuously extends from the first track to the second track, is electromagnetically coupled with the magnetic flux generated by the first plurality of periodical elements and the magnetic flux generated by the second plurality of periodical elements, and detects a phase of the magnetic flux generated by the first plurality of periodical elements and a phase of the magnetic flux generated by the second plurality of periodical elements.

DESCRIPTION OF EMBODIMENTS

The following is a description of embodiments, with reference to the accompanying drawings.

First Embodiment

Figure 1A:
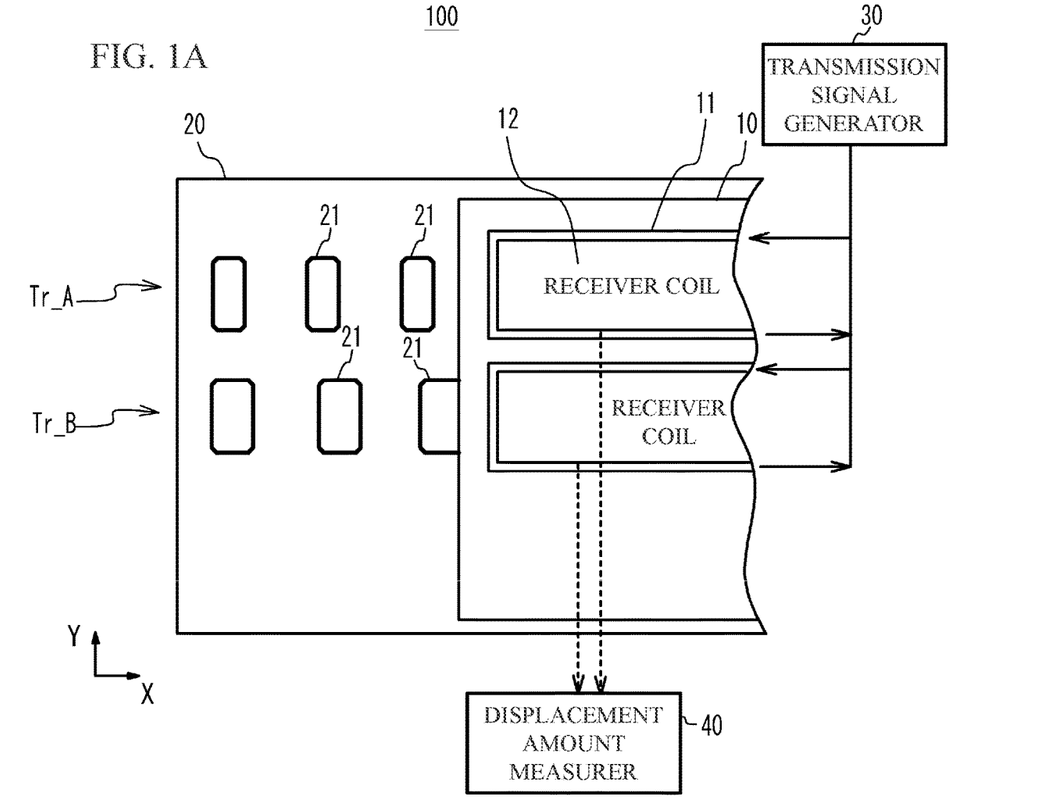
FIG. 1A illustrates a structure of an electromagnetic induction type encoder of a first embodiment.

FIG. 1A illustrates a structure of an electromagnetic induction type encoder 100 using electromagnetic connection between a detection head and a scale. The electromagnetic induction type encoder 100 has a detection head 10 and a scale 20. The detection head 10 relatively moves in a measurement axis direction with respect to the scale 20. The detection head 10 and the scale 20 have a flat plate shape and face with each other through a predetermined gap. The electromagnetic induction type encoder 100 has a transmission signal generator 30 and a displacement amount measurer 40 and so on. In FIG. 1A, X-axis indicates a displacement direction of the detection head 10 (measurement axis). Y-axis is vertical to the X-axis in a plane formed by the scale 20.

The detection head 10 has transceiver coils 11, receiver coils 12 and so on. The transceiver coil 11 is a rectangular coil of which a longitudinal direction is the X-axis. As illustrated in FIG. 1A, the receiver coil 12 is inside of the transceiver coil 11. The shape of the receiver coil 12 will be described later.

In the scale 20, a plurality of connection conductors 21 are arrayed in a fundamental period λ, along the X-axis. The fundamental period λ, is an interval between centers of two of the connection conductors 21 next to each other. Each of the connection conductors 21 is a closed loop coil or a board shape conductor without a hole. The connection conductors 21 are electromagnetically coupled with the transceiver coil 11 and is also electromagnetically coupled with the receiver coil 12.

Figure 1B:
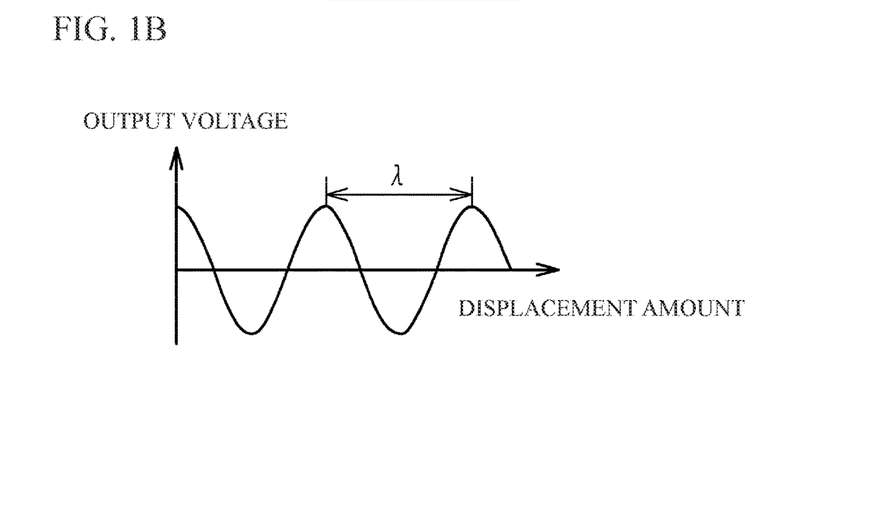
FIG. 1B illustrates a detected sine wave signal.

The transmission signal generator 30 generates a transmission signal of a single-phase AC and supplies the generated transmission signal to the transceiver coil 11. In this case, magnetic flux is generated in the transceiver coil 11. Thus, an electromotive current is generated in the plurality of connection conductors 21. The plurality of connection conductors 21 are electromagnetically coupled with the magnetic flux generated by the transceiver coil 11 and generate magnetic flux fluctuating in the X-axis direction in a predetermined spatial period. The magnetic flux generated by the connection conductors 21 generates an electromotive current in the receiver coil 12. The electromagnetic coupling between the connection conductor 21 and the receiver coil 12 fluctuates in accordance with the displacement amount of the detection head 10. Thereby, a sine wave signal of the same period as the fundamental period λ, is obtained, as illustrated in FIG. 1B. Therefore, the receiver coil 12 detects a phase of the magnetic flux generated by the plurality of connection conductors 21. The displacement amount measurer 40 can use the sine wave signal as a digital amount of a minimum resolution by electrically interpolating the sine wave signal. Thereby, the displacement amount measurer 40 measures the displacement amount of the detection head 10. In FIG. 1B, a horizontal axis indicates the displacement amount of the detection head 10. A vertical axis indicates an output voltage of the receiver coil 12.

One track is structured by the transceiver coils 11, the receiver coils 12 and the connection conductors 21 that are electromagnetically coupled with each other. In the embodiment, the electromagnetic induction type encoder 100 has a first track Tr_A and a second track Tr_B. The first track Tr_A and the second track Tr_B are arrayed at a predetermined interval in the Y-axis direction. Fundamental periods λ, are different from each other in the first track Tr_A and the second track Tr_B. Thus, the electromagnetic induction type encoder 100 acts as an absolute (ABS) type encoder.

Figure 2A:
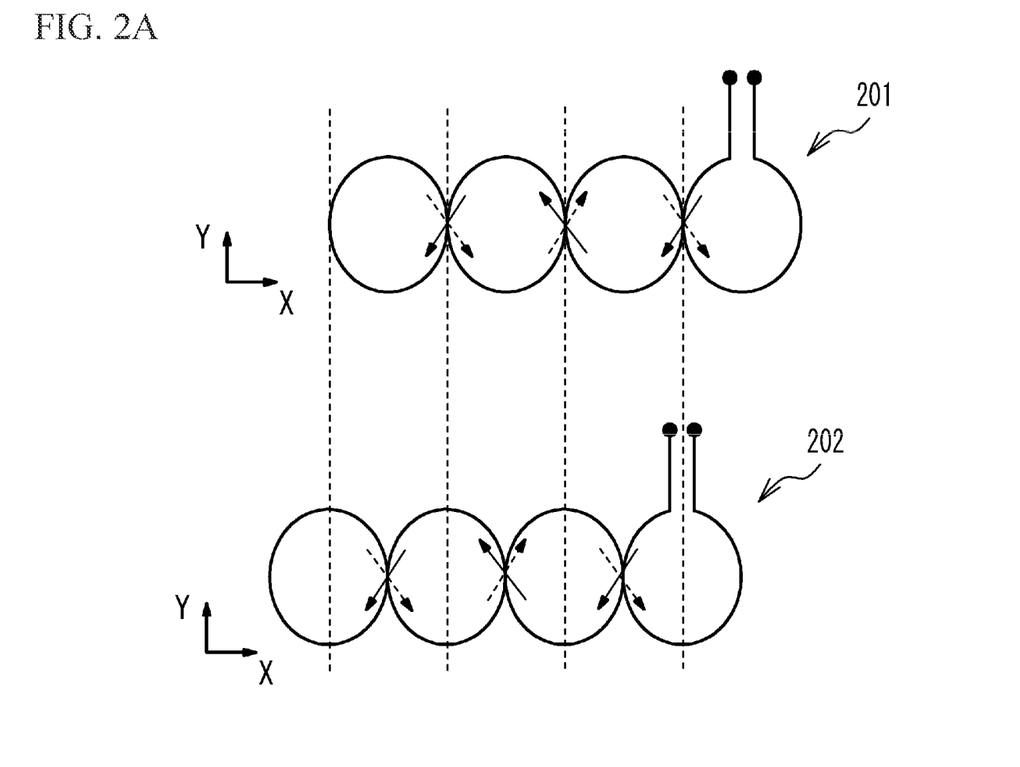
FIG. 2A and FIG. 2B illustrate a receiver coil of a comparative embodiment.
Figure 2B:
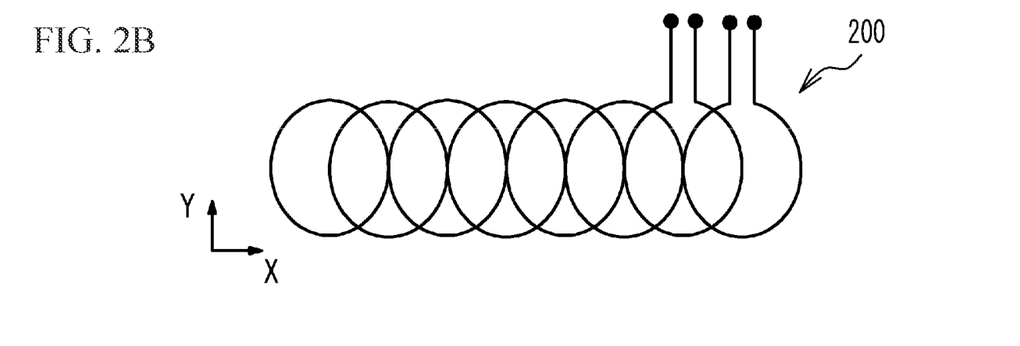
Figure 3:
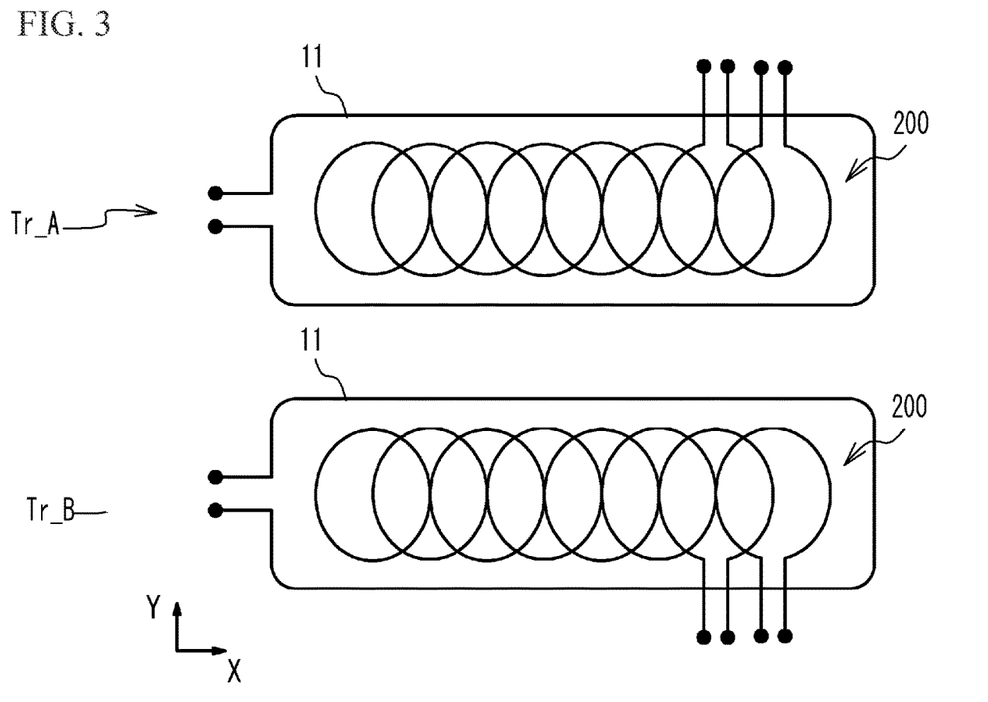
FIG. 3 illustrates a receiver coil of a comparative embodiment.

FIG. 2A, FIG. 2B and FIG. 3 illustrate a receiver coil 200 of a comparative embodiment. An upper figure of FIG. 2A illustrates a first coil 201 of the receiver coil 200. A lower figure of FIG. 2A illustrates a second coil 202 of the receiver coil 200. A wiring of the first coil 201 extends along a sine wave toward the minus direction of the X-axis, returns at an end, and extends along another sine wave toward the plus direction of the X-axis. The sine wave extending toward the minus direction of the X-axis is symmetrical to the sine wave extending toward the plus direction of the X-axis, with respect to the Y-axis. As illustrated in FIG. 2A, the second coil 202 has the same structure as the first coil 201. As illustrated in FIG. 2B, the second coil 202 is shifted by ¼ of the period of the sine waves with respect to the first coil 201, in the X-axis direction.

It is necessary for the first coil 201 to have two extraction wirings. It is necessary for the second coil 202 to have two extraction wirings. It is therefore necessary for the receiver coil 200 to have four extraction wirings. It is necessary for the transceiver coil 11 to have two extraction wirings. As illustrated in FIG. 3, it is therefore necessary to provide extraction wirings in the first track Tr_A and the second track Tr_B. When the number of the track is increased in order to lengthen the ABS length, the number of the extraction wirings increases in proportion to the number of the track. When the receiver coil has a three-phase structure, the number of the extraction wirings further increases. However, an area of the detection head is limited. When the number of the extraction wirings of the receiver coil increases, it is difficult to downsize the detection head. The number of the input port to a signal processing IC increases. It is therefore difficult to down size the IC. It is important to reduce the number of the extraction wirings of the receiver coil, in order to provide an encoder which has a small size and has a long ABS length.

Figure 4A:
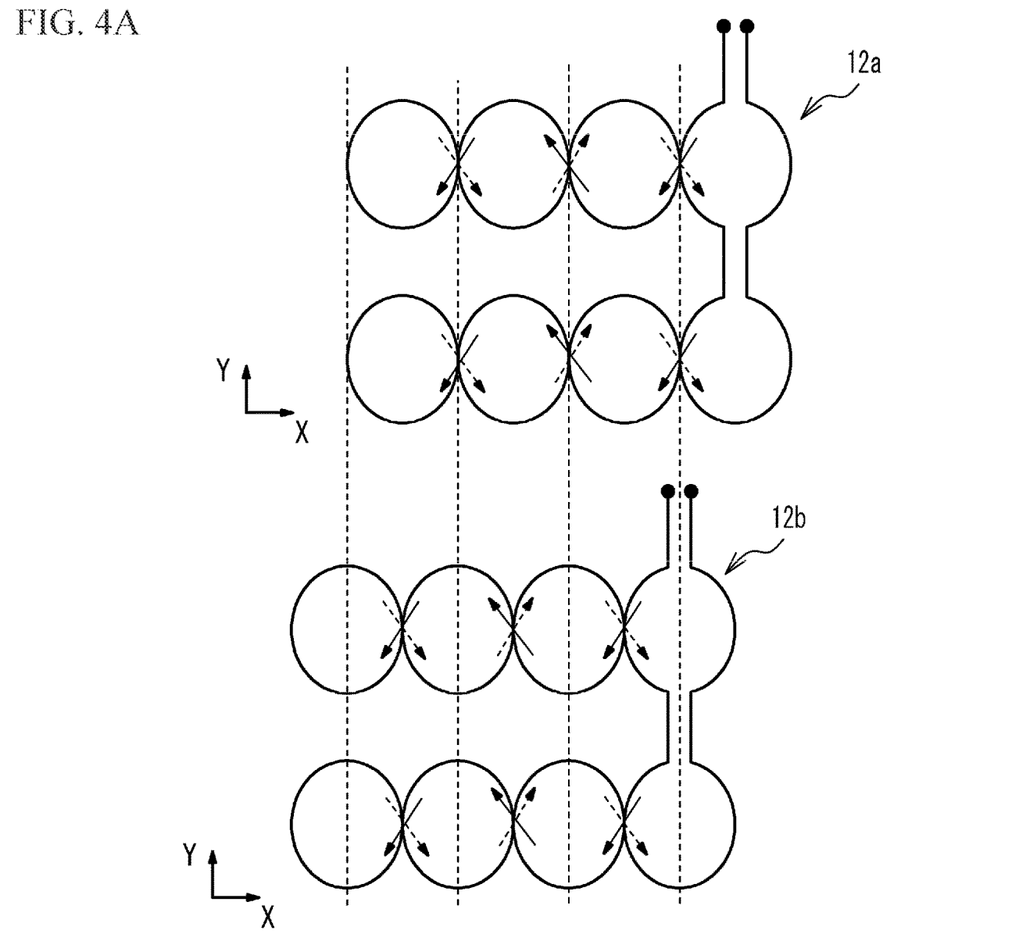
FIG. 4A and FIG. 4B illustrate details of a receiver coil of a first embodiment.
Figure 4B:
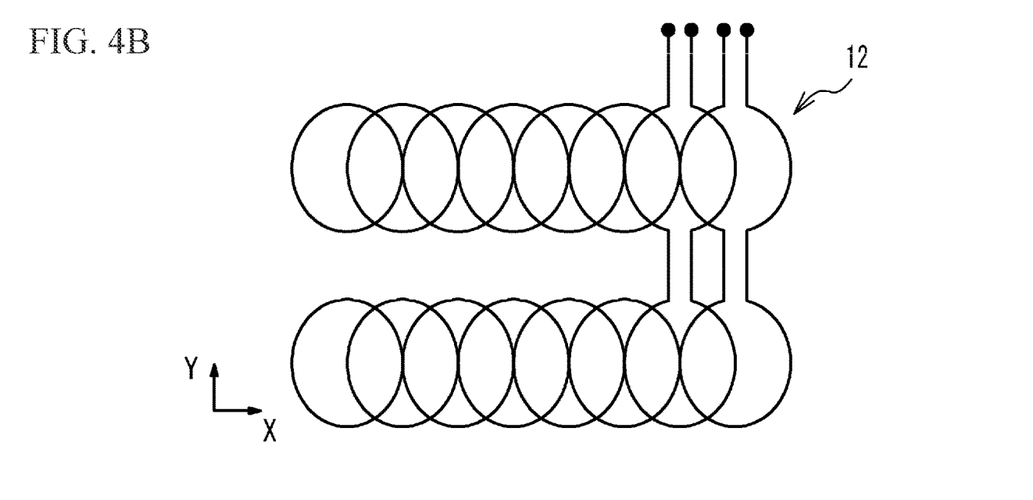
Figure 5:
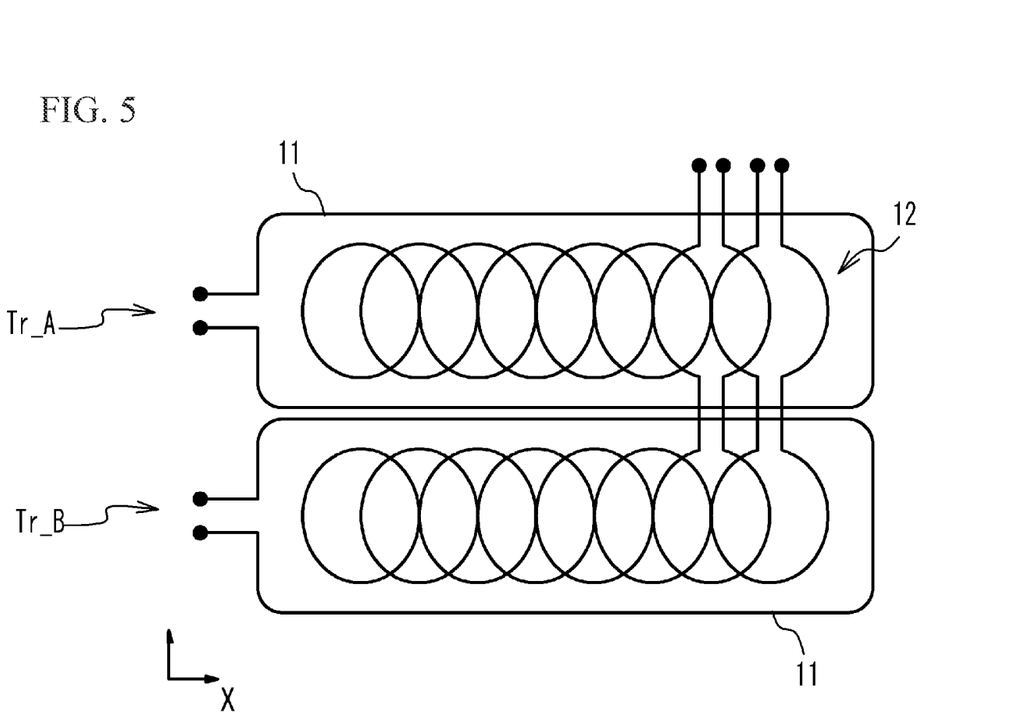
FIG. 5 illustrates details of a receiver coil of a first embodiment.

And so, the electromagnetic induction type encoder 100 has a structure for reducing the number of extraction wirings of the receiver coil. FIG. 4A, FIG. 4B and FIG. 5 illustrate details of the receiver coil 12. The receiver coil 12 has a first coil 12a and a second coil 12b. The first coil 12a and the second coil 12b are common with respect to the first track Tr_A and the second track Tr_B.

As illustrated in an upper figure of FIG. 4A, in the first track Tr_1, a wiring of the first coil 12a extends along a sine wave toward the minus direction of the X-axis direction, returns at an end, and extends along another sine wave toward the plus direction of the X-axis direction. After that, the wiring extends toward the second track Tr_B. In the second track Tr_B, the wiring extends along a sine wave toward the minus direction of the X-axis direction, returns at an end, and extends along another sine wave toward the plus direction of the X-axis direction. After that, the wiring extends toward the first track Tr_A. Therefore, in the first coil 12a, the wiring continuously extends in the first track Tr_A and the second track Tr_B. In the first coil 12a, the sine wave extending toward the minus direction of the X-axis direction is symmetrical to the sine wave extending toward the plus direction of the X-axis direction, with respect to the Y-axis direction. As illustrated in a lower figure of FIG. 4A, the second coil 12b has the same structure of the first coil 12a. As illustrated in FIG. 4B, the second coil 12b is shifted by ¼ of the period of the sine wave in the X-axis direction, with respect to the first coil 12a.

In the structure, the number of the extraction wirings of the receiver coil 12 is four. The number of each of the transceiver coil 11 is two. Therefore, as illustrated in FIG. 5, the total number of the extraction wirings of the first track Tr_A and the second track Tr_B is eight. Accordingly, the number of the extraction wirings of the receiver coil 12 of the embodiment is smaller than the number of the extraction wirings of the receiver coil 200 of the comparative example.

Figure 6A:
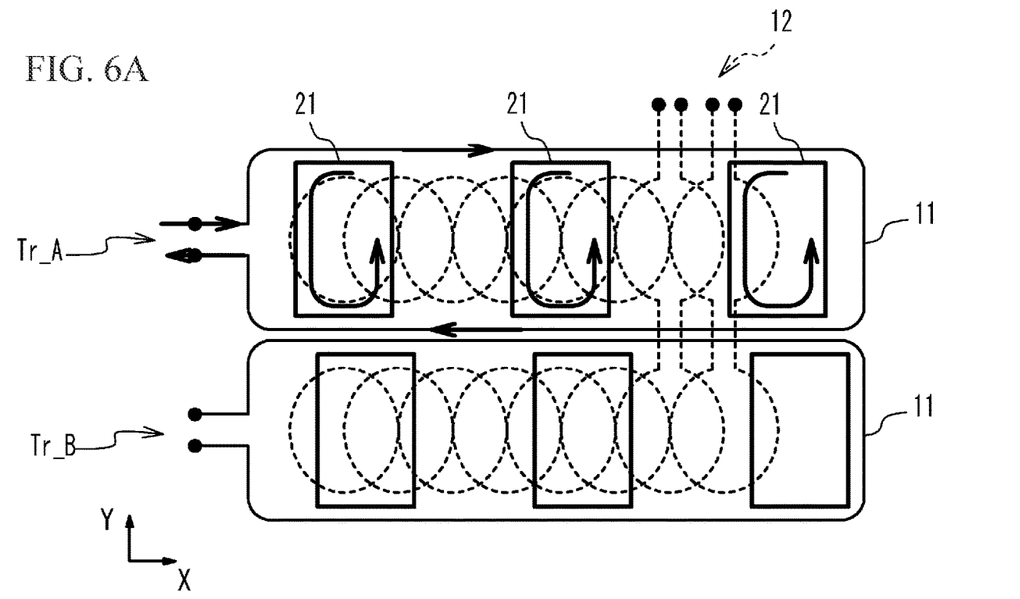
FIG. 6A and FIG. 6B illustrate a using method of an electromagnetic induction type encoder.
Figure 6B:
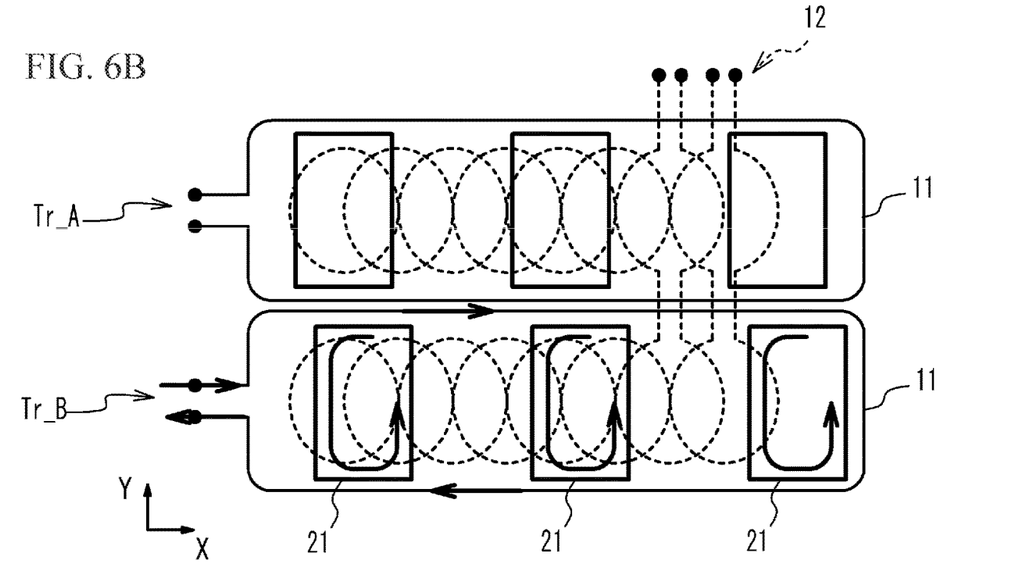

When a signal of the first track Tr_A is extracted, the transmission signal generator 30 does not transmit a transmission signal to the transceiver coil 11 of the second track Tr_B but transmits a transmission signal to the transceiver coil 11 of the first track Tr_A, as illustrated in FIG. 6A. On the other hand, when a signal of the second track Tr_B is extracted, the transmission signal generator 30 does not transmit a transmission signal to the transceiver coil 11 of the first track Tr_A but transmits a transmission signal to the transceiver coil 11 of the second track Tr_B, as illustrated in FIG. 6B. In this manner, each of the transceiver coils 11 of the tracks is driven at a different timing. It is therefore possible to select a signal from the tracks.

In the above-mentioned embodiment, the transceiver coils 11 are examples of a first transceiver coil configured to generate magnetic flux with respect to a first track and a second transceiver coil configured to generate magnetic flux with respect to a second track. The connection conductors 21 are examples of a first plurality of periodical elements that are conductors periodically arrayed in the measurement axis with respect to the first track and a second plurality of periodical elements that are conductors periodically arrayed in the measurement axis with respect to the second track. The receiver coil 12 is an example of a receiver coil that continuously extends from the first track to the second track, is electromagnetically coupled with the magnetic flux generated by the first plurality of periodical elements and the magnetic flux generated by the second plurality of periodical elements, and detects a phase of the magnetic flux generated by the first plurality of periodical elements and a phase of the magnetic flux generated by the second plurality of periodical elements. The transmission signal generator 30 is an example of a transmission signal generator configured to transmit a first transmission signal to the first transceiver coil of the first track and transmit a second transmission signal to the second transceiver coil of the second track. The displacement amount measurer 40 is an example of a displacement amount measurer configured to measure a relative displacement amount between the detection head and the scale, on a basis of a signal output from the receiver coil.

Modified Embodiment

Figure 7A:
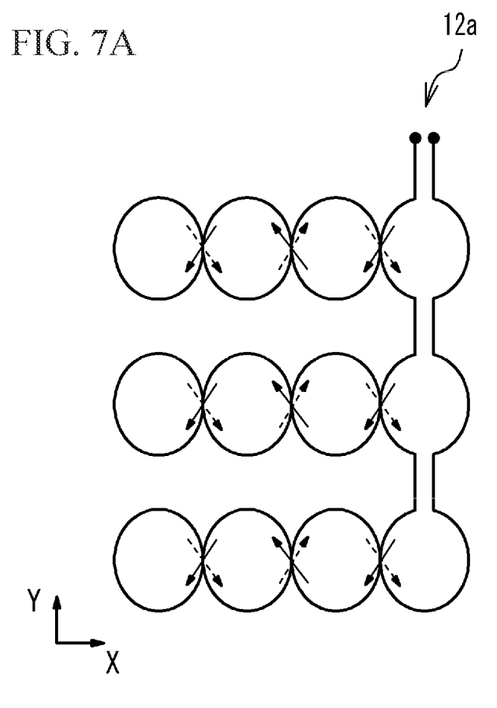
FIG. 7A to FIG. 7C illustrate details of a receiver coil applied to three tracks.
Figure 7B:
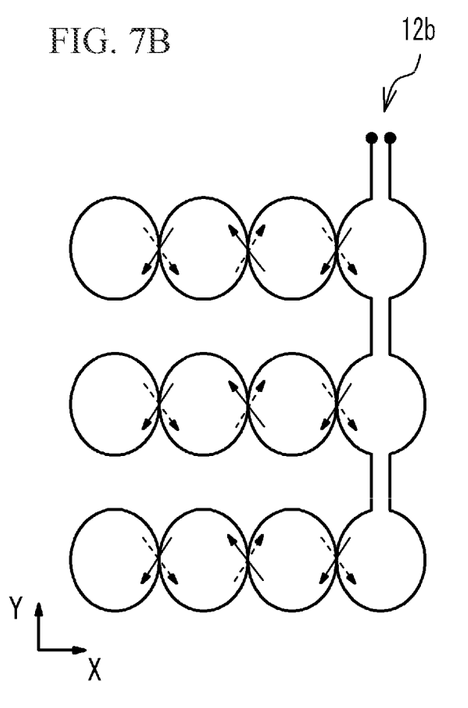
Figure 7C:
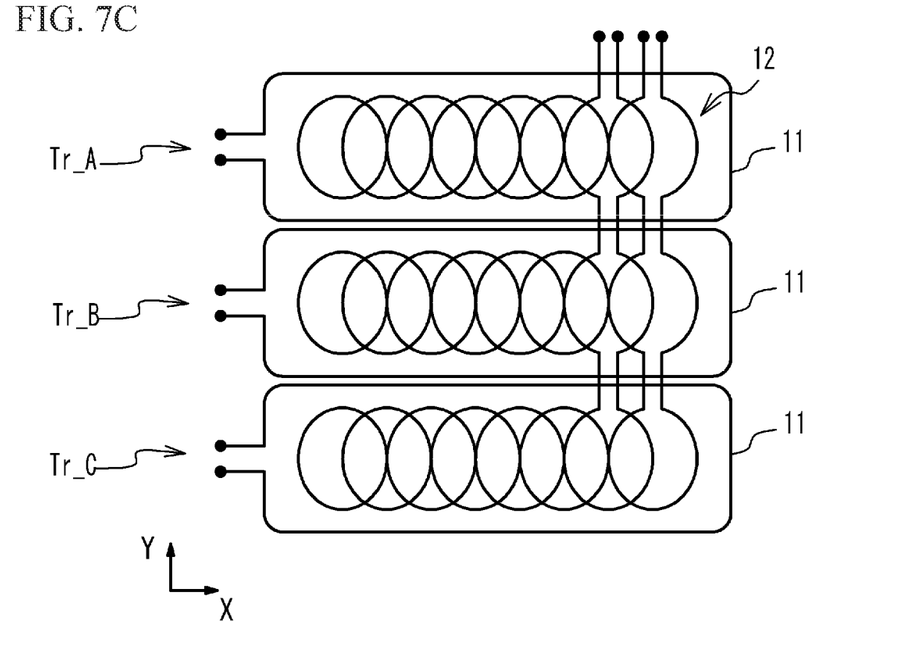

In FIG. 5, the number of the track is two. However, the number is not limited. The number of the track may be three or more. FIG. 7A to FIG. 7C illustrate details of the receiver coil 12 applied to a three-track structure. In the modified embodiment, the first coil 12a and the second coil 12b are common with respect to the first track Tr_A, the second track Tr_B and the third track Tr_C. Each of the first track Tr_A to the third track Tr_C has one transceiver coil 11.

As illustrated in FIG. 7A, in the first track Tr_A, the wiring of the first coil 12a extends along a sine wave toward the minus direction of the X-axis direction, returns at an end, and extends along another sine wave toward the plus direction of the X-axis direction. After that, the wiring extends toward the second track Tr_B. In the second track Tr_B, the wiring extends along a sine wave toward the minus direction of the X-axis direction, returns at an end, and extends along another sine wave toward the plus direction of the X-axis direction. After that, the wiring extends toward the third track Tr_C. In the third track Tr_C, the wiring extends along a sine wave toward the minus direction of the X-axis direction, returns at an end, and extends along another sine wave toward the plus direction of the X-axis direction. After that, the wiring+extends toward the first track Tr_A. Therefore, in the first coil 12a, the wiring continuously extends in the first track Tr_A to the third track Tr_C. In the first coil 12a, the sine waves extending toward the minus direction of the X-axis direction are symmetrical to the sine waves extending toward the plus direction of the X-axis direction, with respect to the Y-axis direction. As illustrated in FIG. 7B, the second coil 12b has the same structure of the first coil 12a. As illustrated in FIG. 7C, the second coil 12b is shifted by ¼ of the period of the sine wave in the X-axis direction, with respect to the first coil 12a.

In the structure, the number of the extraction wirings of the receiver coil 12 is four. The number of each of the transceiver coil 11 is two. Therefore, as illustrated in FIG. 7C, the total number of the extraction wirings of the first track Tr_A to the third track Tr_C is ten. Accordingly, the number of the extraction wirings of the receiver coil 12 of the modified embodiment is smaller than the number of the extraction wirings in case where each receiver coils has two extraction wirings in each track.

When a signal of the first track Tr_A is extracted, the transmission signal generator 30 transmits a transmission signal to neither the transceiver coil 11 of the second track Tr_B nor the transceiver coil 11 of the third track Tr_C but transmits a transmission signal to the transceiver coil 11 of the first track Tr_A. On the other hand, when a signal of the second track Tr_B is extracted, the transmission signal generator 30 transmits a transmission signal to neither the transceiver coil 11 of the first track Tr_A nor the transceiver coil 11 of the third track Tr_C but transmits a transmission signal to the transceiver coil 11 of the second track Tr_B. When a signal of the third track Tr_C is extracted, the transmission signal generator 30 transmits a transmission signal to neither the transceiver coil 11 of the first track Tr_A nor the transceiver coil 11 of the second track Tr_B but transmits a transmission signal to the transceiver coil 11 of the third track Tr_C. In this manner, each of the transceiver coils 11 of the tracks is driven at a different timing. It is therefore possible to select a signal from the tracks.

Second Embodiment

Figure 8A:
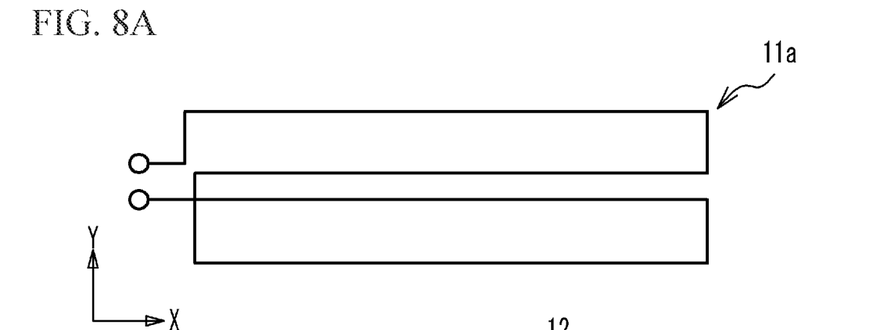
FIG. 8A to FIG. 8D illustrate a second embodiment.
Figure 8B:
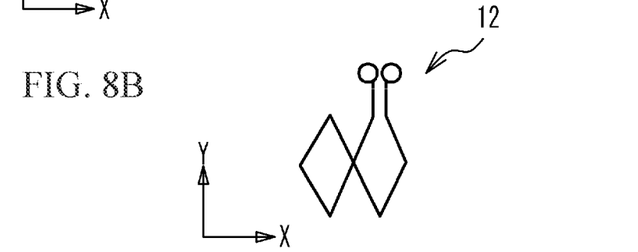

FIG. 8A illustrates a transceiver coil 11a in accordance with a second embodiment. The transceiver coil 11a has a twist structure in which two rectangular coil having a longitudinal direction in the X-axis direction are arrayed along the Y-axis direction and are connected so that current flows of the two rectangular coils are opposite to each other. That is, the transceiver coil 11a has two coils.

In the embodiment, in order to simplify the explanation of the receiver coil 12, the receiver coil 12 has a twist structure in which two coils are arrayed along the X-axis direction and are connected so that current flows of the two coils are opposite to each other. Both of the coils of the receiver coil 12 extends to both of the rectangular coils of the transceiver coil 11a.

Figure 8C:
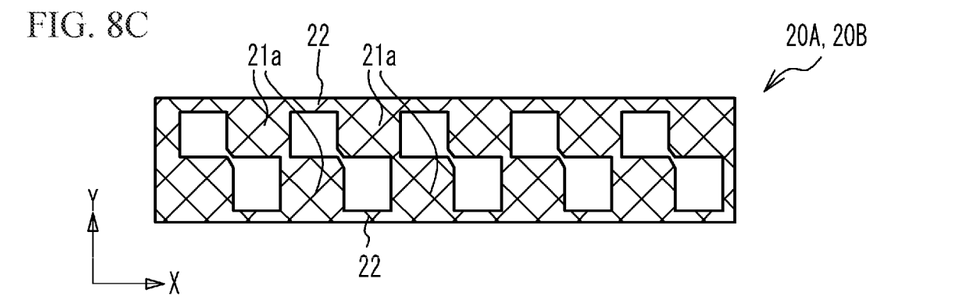

A scale 20A has a structure in which a plurality of elements arrayed periodically are connected to each other. As illustrated in FIG. 8C, the scale 20A has a structure in which a plurality of periodical elements 21a which are made of conductor and are arrayed in a fundamental period λ, along the X-axis direction, and the periodical elements 21a are connected to each other by connection portions 22. Each of the periodical elements 21a is electromagnetically connected with the transceiver coil 11a and is electromagnetically connected with the receiver coil 12. As illustrated in FIG. 8C, each of the periodical elements 21a has a structure in which two rectangular shapes arrayed along the Y-axis direction are shifted along the X-axis direction and connected to each other. A distance between centers of the two rectangular shapes in the X-axis direction is substantially the same as a distance between centers of the two coils of the receiver coil 12 in the X-axis direction. In a case where the periodical elements 21a have the above-mentioned shape, one of the coils of the receiver coil 12 is positioned in one of the rectangular shapes of the periodical elements 21a when the other of the receiver coil 12 is positioned in the other of the rectangular shapes. Each of the periodical elements 21a is connected with the connection portions 22 which is conductor. In the Y-axis direction, a width of the connection portion 22 is smaller than a width of the periodical element 21a. In FIG. 8C, edges of the periodical elements 21a in the Y-axis direction are connected with the connection portions 22.

Each of the periodical element 21a and the connection portion 22 of the second track Tr_B has the same structure as each of the periodical element 21a and the connection portion 22 of the first track Tr_A. The fundamental period of the periodical element 21a of the first track Tr_A is different from that of the second track Tr_B.

Figure 8D:
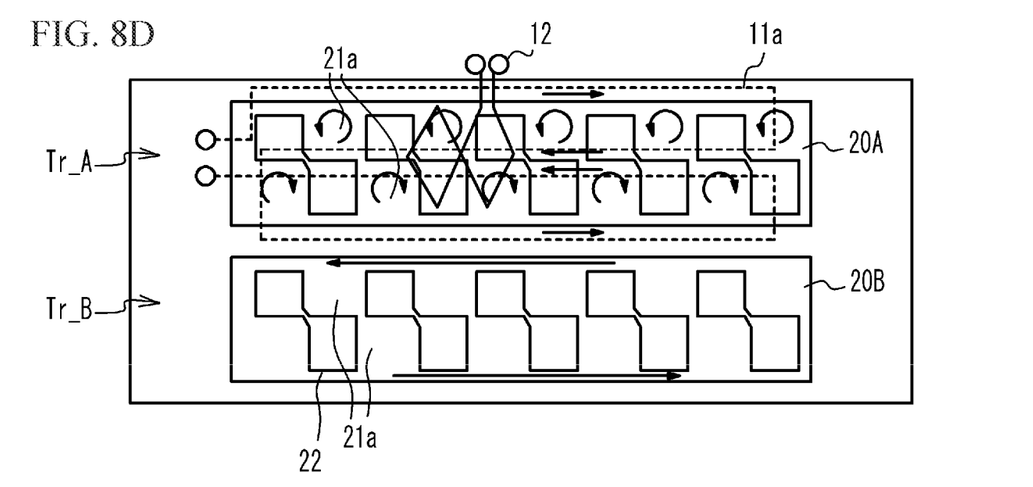

When a transmission signal of a single-phase AC is supplied to the transceiver coil 11a of the first track Tr_A from the transmission signal generator 30, the transceiver coil 11a of the first track Tr_A generates magnetic flux. Thus, the plurality of periodical elements 21a of the first track Tr_A generate electromotive force. As illustrated in FIG. 8D, in each of the periodical elements 21a of the second track Tr_B, an eddy current is going to flow in a direction opposite to a current in a part of the transceiver coil 11a of the second track Tr_B which is the closest to second track Tr_B. However, in the embodiment, each of the periodical is connected by each of the connection portions 22. Therefore, in a large area of a scale 20B of the second track Tr_B, substantially even current flows. Therefore, unevenness of the influence of the second track Tr_B at each position in a scale is suppressed. That is, influence between the tracks is suppressed. And, the measurement accuracy is improved.

In each of the periodical elements 21a of the first track Tr_A, currents flowing toward an opposite direction is generated in each rectangular region. In concrete, in the first track Tr_A, eddy currents flowing toward an opposite direction are generated at positions corresponding to the rectangular coils of the transceiver coil 11a, in each of the periodical elements 21a. When each coil of the receiver coil 12 receives the eddy current, a signal can be detected. In this manner, when the eddy currents flowing toward an opposite direction are generated at each position shifted in the Y-axis direction in regions connected along the Y-axis direction, it is possible to detect a signal by electromagnetically connecting each eddy current with each coil of the receiver coil 12 even if each of the periodical elements 21a are connected to each other.

Therefore, in the embodiment, even if the receiver coil 12 continuously extends from the first track Tr_A to the second track Tr_B, signal mixing through a scale of a next track is suppressed.

In the above-mentioned embodiment, the transceiver coils 11a are examples of a first transceiver coil configured to generate magnetic flux with respect to a first track and a second transceiver coil configured to generate magnetic flux with respect to a second track. The periodical elements 21a are examples of a first plurality of periodical elements that are conductors periodically arrayed in the measurement axis with respect to the first track and a second plurality of periodical elements that are conductors periodically arrayed in the measurement axis with respect to the second track.

The present invention is not limited to the specifically disclosed embodiments and variations but may include other embodiments and variations without departing from the scope of the present invention.

What is claimed is:

1. An electromagnetic induction type encoder comprising:
   a detection head and a scale that face with each other and relatively moves in a measurement axis with respect to each other,
   wherein the detection head has a first transceiver coil configured to generate magnetic flux with respect to a first track and a second transceiver coil configured to generate magnetic flux with respect to a second track,
   wherein the scale has a first plurality of periodical elements that are conductors periodically arrayed in the measurement axis with respect to the first track and a second plurality of periodical elements that are conductors periodically arrayed in the measurement axis with respect to the second track,
   wherein a period of the first plurality of periodical elements is different from a period of the second plurality of periodical elements,
   wherein the detection head has a receiver coil that continuously extends from the first track to the second track, is electromagnetically coupled with the magnetic flux generated by the first plurality of periodical elements and the magnetic flux generated by the second plurality of periodical elements, and detects a phase of the magnetic flux generated by the first plurality of periodical elements and a phase of the magnetic flux generated by the second plurality of periodical elements.

2. The electromagnetic induction type encoder as claimed in claim 1, further comprising:
   a transmission signal generator configured to transmit a first transmission signal to the first transceiver coil of the first track and transmit a second transmission signal to the second transceiver coil of the second track; and
   a displacement amount measurer configured to measure a relative displacement amount between the detection head and the scale, on a basis of a signal output from the receiver coil,
   wherein the transmission signal generator does not transmit the second transmission signal to the second transceiver coil when transmitting the first transmission signal to the first transceiver coil, and does not transmit the first trans mission signal to the first transceiver coil when transmitting the second transmission signal to the second transceiver coil.

3. The electromagnetic induction type encoder as claimed in claim 1, wherein the period of the first plurality of periodical elements is different from the period of the second plurality of periodical elements along the measurement axis, or positions of the first plurality of periodical elements are different of positions of the second plurality of periodical elements.

4. The electromagnetic induction type encoder as claimed in claim 1, wherein the first plurality of periodical elements are connected to each other through a conductor,
   wherein the second plurality of periodical elements are connected to each other through a conductor,
   wherein the first transceiver coil and the second transceiver coil have a wiring so that two or more eddy currents flowing in an opposite direction are generated in each of the first plurality of periodical elements and each of the second plurality of periodical elements.

5. The electromagnetic induction type encoder as claimed in claim 4, wherein the receiver coil has two or more coils configured to generate the two or more eddy currents.

6. The electromagnetic induction type encoder as claimed in claim 1, wherein each of the first plurality of periodical elements is not connected to each of the second plurality of periodical elements.

7. A using method of an electromagnetic induction type encoder comprising:
  transmitting a first transmission signal to a first transceiver coil of a first track while not transmitting a second transmission signal to a second transceiver coil of a second track; and
  transmitting the second transmission signal to the second transceiver coil while not transmitting the first transmission signal to the first transceiver coil,
  wherein the electromagnetic induction type encoder comprises a detection head and a scale that face with each other and relatively moves in a measurement axis with respect to each other,
  wherein the detection head has the first transceiver coil configured to generate magnetic flux with respect to the first track and the second transceiver coil configured to generate magnetic flux with respect to the second track,
  wherein the scale has a first plurality of periodical elements that are conductors periodically arrayed in the measurement axis with respect to the first track and a second plurality of periodical elements that are conductors periodically arrayed in the measurement axis with respect to the second track,
  wherein a period of the first plurality of periodical elements is different from a period of the second plurality of periodical elements,
  wherein the detection head has a receiver coil that continuously extends from the first track to the second track, is electromagnetically coupled with the magnetic flux generated by the first plurality of periodical elements and the magnetic flux generated by the second plurality of periodical elements, and detects a phase of the magnetic flux generated by the first plurality of periodical elements and a phase of the magnetic flux generated by the second plurality of periodical elements.

8. The method as claimed in claim 7, wherein each of the first plurality of periodical elements is not connected to each of the second plurality of periodical elements.

* * * * *